US011530690B2

(12) United States Patent
Kronhaus

(10) Patent No.: US 11,530,690 B2
(45) Date of Patent: Dec. 20, 2022

(54) IGNITION PROCESS FOR NARROW CHANNEL HALL THRUSTER

(71) Applicant: TECHNION RESEARCH & DEVELOPMENT FOUNDATION LIMITED, Haifa (IL)

(72) Inventor: Igal Kronhaus, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 16/790,282

(22) Filed: Feb. 13, 2020

(65) Prior Publication Data

US 2020/0256325 A1  Aug. 13, 2020

Related U.S. Application Data

(60) Provisional application No. 62/804,842, filed on Feb. 13, 2019.

(51) Int. Cl.
*F03H 1/00* (2006.01)
*B64G 1/40* (2006.01)

(52) U.S. Cl.
CPC ......... *F03H 1/0075* (2013.01); *F03H 1/0018* (2013.01); *B64G 1/405* (2013.01)

(58) Field of Classification Search
CPC ................... F03H 1/0062–0075; F03H 1/0018
See application file for complete search history.

(56) References Cited

U.S. PATENT DOCUMENTS

| 5,763,989 | A  | 6/1998  | Kaumnan |
| 5,798,602 | A  | 8/1998  | Gopanchuk et al. |
| 6,150,764 | A  | 11/2000 | Hruby et al. |
| 6,448,721 | B2 | 9/2002  | Raitses et al. |

(Continued)

FOREIGN PATENT DOCUMENTS

WO    2019/116371    6/2019

OTHER PUBLICATIONS

Fisher, et. al, "The Design and Development of the MR-510 Arcjet Power Conditioning Unit", American Institute of Aeronautics and Astronautics (AIAA), AIAA-98-3630, 1998, pp. 1-14. (Year: 1998).*

(Continued)

*Primary Examiner* — Arun Goyal
*Assistant Examiner* — William L Breazeal
(74) *Attorney, Agent, or Firm* — Daniel Feigelson

(57) ABSTRACT

A narrow channel Hall thruster comprising a thruster body with a magnetic circuit, an annular thruster channel having a channel width of less than 3 mm formed within the magnetic circuit, an annular anode, a cathode positioned externally to the thruster, and configured for electron emission, a power supply applying a positive potential to the anode, such that a plasma discharge can be generated in the annular thruster channel, and another power supply applying a negative potential to the cathode, relative to the thruster body and the anode. The second power supply reduces its negative voltage output to the cathode when the current supplied by the anode power supply exceeds a predetermined level, indicating that the discharge has reached a stable initiated condition. The reduction of the voltage output of the second power supply can be achieved either by self-regulation, or by use of a current limit circuit.

18 Claims, 2 Drawing Sheets

(56) References Cited

U.S. PATENT DOCUMENTS

| | | | |
|---|---|---|---|
| 6,612,105 B1 | 9/2003 | Voigt et al. | |
| 8,407,979 B1* | 4/2013 | Hofer | F03H 1/0075 60/202 |
| 8,613,188 B2 | 12/2013 | Stein et al. | |
| 2005/0035731 A1 | 2/2005 | Secheresse et al. | |
| 2019/0309736 A1* | 10/2019 | Brotons | F03H 1/0018 |

OTHER PUBLICATIONS

A.A. Shagayda and O.A. Gorshkov, "Hall-Thruster Scaling Laws", J. Propul. Power 29 (2) 466-474, 2013.

Igal Kronhaus and Alexander Linossier, "Experimental characterization of the narrow channel Hall thruster" 2018 Plasma Sources Sci. Technol. 27 124005.

David Belt and John Mankowski, "Diagnostics of the Start-Up Process of an Arc Hollow Cathode" IEEE Transactions on plasma Science, vol. 36 No. 4, Aug. 2008.

* cited by examiner

IGNITION PROCESS FOR NARROW CHANNEL HALL THRUSTER

RELATED APPLICATIONS

This application claims the benefit of provisional application Ser. No. 62/804,842, filed Feb. 13, 2019 and entitled "Ignition process of a low power EXB thruster with a cathode neutralizer", the contents of which are incorporated herein in their entirety by reference.

TECHNICAL FIELD

The present disclosure relates generally to the field of Hall thrusters and methods of their operation, especially for use at low and at variable powers.

BACKGROUND

Hall thrusters, also known as closed drift accelerators, are successful electric propulsion (EP) systems commonly used for spacecraft propulsion. Hall thrusters exhibit favorable properties, including electric efficiency of about 50%, high exhaust velocities in the range of 10-25 km/sec, and substantial thrust with a current density of the order of 1000 $A/m^2$.

Usually, in a Hall thruster, a closed-path electron drift is induced within an annular channel in crossed electric and magnetic fields. A magnetic circuit generates a radial magnetic field, which effectively magnetizes the electrons, while ions remain unconfined. An axial electric field is generated by applying a potential difference between a backplate anode, which may also act as the gas distributor, and an external cathode (outside the channel). A propellant mass flow rate is selected to obtain efficient electron impact ionization, while maintaining a low ion-atom collision frequency in order to allow for free motion of ions in the channel.

The two conventional annular Hall thruster designs differ by the material composition of the channel walls. One type, wherein the channel walls are made from a ceramic material, is known as a magnetic-layer accelerator or a stationary plasma thruster (SPT). The other type, wherein the channel walls are made from metal, is known as a thruster with an anode-layer (TAL).

In SPT, energetic electrons coming from the acceleration region are absorbed by the ceramic walls, and low energy secondary electrons are emitted instead. This mechanism regulates the electron temperature permitting the existence of extended ionization and acceleration regions.

In TAL, the metal walls have low secondary electron emission which makes the electron temperature very high. The high temperature electrons introduce significant electric sheath effects, with much of the potential difference occurring in a short distance of the order of one electron orbit in the local magnetic field. This short distance is located near an anode potential electrode, hence the name "anode layer".

To reduce the cost of space missions there is a general trend towards spacecraft and component miniaturization. In particular, nanosatellites, miniaturized spacecraft less than 20 kg in mass (sometimes defined as less than 12 kg in mass), are envisioned to operate in a formation of several spacecrafts and therefore require propulsion capacity. For a nanosatellite, EP is preferred over chemical propulsion as it allows for large savings in propellant mass. However, nanosatellites can generate only a limited amount of power for the EP system, typically between 2 W for the smallest CubeSats and 30 W for the larger nanosatellite versions, using state-of-the-art solar panels.

Historically, Hall thrusters were designed to operate at power levels above 300 W. Scaling existing Hall thruster designs to lower operating power, using simple linear scaling laws, has proven to be difficult. Reports in the literature, for example [A. A. Shagayda and O. A. Gorshkov, "Hall-Thruster Scaling Laws", J. Propul. Power 29 (2), 466-474, 2013], indicate an electrical efficiency drop to 10% at power levels below 100 W. Thus, the use of Hall thrusters for nanosatellite propulsion has so far proven problematic, with no reports of successful operation of conventional annular Hall thrusters at powers below 50 W.

U.S. Pat. No. 5,763,989 to Kaufman discloses closed-drift ion sources of the magnetic-layer and anode-layer types, with both one-stage and two stage versions of the latter disclosed. Specific improvements include the use of a magnetically permeable insert in the closed drift region together with an effectively single source of magnetic field to facilitate the generation of a well-defined and localized magnetic field while, at the same time, permitting the placement of that magnetic field source at a location well removed from the hot discharge region. Such a configuration is also well suited to the use of a permanent magnet as the magnetic field source. In one embodiment, a baffle arrangement serves to distribute the ionizable gas uniformly circumferentially and decrease its pressure below the Paschen-law minimum before exposure to the anode potential.

U.S. Pat. No. 5,798,602 to Gopanchuk et al. discloses an accelerator which comprises a magnetic system, having an external magnetic pole and an internal magnetic pole which are interconnected by a magnetic circuit, an outer magnetic screen, an inner magnetic screen, a central magnetizing coil and external magnetizing coils. Besides, the accelerator has a discharge chamber comprising a concave anode encompassing magnetic force surfaces of an ionization zone, a sectional gas distributor, an inner side wall and an outer side wall, the internal surfaces whereof in the ionization zone are located at an angle to a longitudinal axis of the accelerator.

U.S. Pat. No. 6,150,764 to Hruby et al. discloses a tandem Hall field plasma accelerator with closed electron drift which includes a magnetic circuit having an inner pole and an outer pole and a magnetic field source and a discharge cavity disposed axially in tandem; the discharge cavity including an axially extending accelerator section defining an exit aperture between the inner and outer poles and a plenum section extending radially outwardly and upstream of the accelerator section and including an anode and a propellant injector. Also disclosed is the use of an electromagnetic coil which provides a magnetic field in a magnetic circuit and includes a multiple turn winding wound on an electrically conductive bobbin. The plasma discharge is connected electrically in series with the electromagnetic coil and a power source with a bobbin defining a single turn secondary coil winding on the magnetic circuit which reduces magnetic field fluctuations in the plasma discharge and reduces eddy currents and consequent heating of the magnetic circuit.

U.S. Pat. No. 6,448,721 to Raitses et al. discloses an apparatus and method for thrusting plasma, utilizing a Hall thruster with a cylindrical geometry, wherein ions are accelerated in substantially the axial direction. The apparatus is suitable for operation at low power. It employs small size thruster components, including a ceramic channel, with the center pole piece of the conventional annular design thruster eliminated or greatly reduced. Efficient operation is accomplished through magnetic fields with a substantial radial component. The propellant gas is ionized at an optimal location in the thruster. A further improvement is accomplished by segmented electrodes, which produce localized voltage drops within the thruster at optimally prescribed locations. The apparatus differs from a conventional Hall thruster, which has an annular geometry, not well suited to scaling to small size, because the small size for an annular design has a great deal of surface area relative to the volume.

U.S. Pat. No. 6,612,105 to Voigt et al. discloses a system for uniformly distributing propellant gas in a Hall-effect thruster (HET) which includes an anode and a porous material gas distributor (PMGD). The porous material may be porous metal or porous ceramic. Propellant gas is directed from a supply to the PMGD for distribution into a gas discharge region of the HET. The gas flows through the porous material of the PMGD and out of the PMGD's exit surface into the annular gas discharge region. The PMGD has an average pore size, pore density and thickness that are optimized to control the flow of the gas at the desired flow rate and distribution uniformity at a relatively short distance downstream from the PMGD. This feature allows HET to be short, significantly decreasing susceptibility to vibration problems encountered during vehicle launch. The PMGD can include a shield for preventing contaminants from traveling upstream from the gas discharge region from adhering to the porous metal. The shield may be integrated into the PMGD or be a separate shield. In addition, the shield may be perforated so as to allow gas to pass through the shield to further decrease the distance needed to achieve uniform gas distribution. Alternatively, the exit surface of the porous metal may be oriented to face perpendicularly from the gas discharge path out of the HET, which significantly reduces the probability of contaminants adhering to the exit surface.

In International Patent Application published as WO 2019/116371, for Narrow Channel Hall Thruster, commonly owned by the present applicant, and having a common inventor with the present application, there is described a closed drift, narrow channel Hall thruster configured to operate at powers of down to below 30 W. The thruster includes a thruster body and a neutralizing cathode. The thruster body includes a magnetic circuit including a magnetic source and two magnetic poles, a metallic, annular thruster channel formed by the magnetic poles with a downstream channel width smaller than about 3 mm and an upstream channel width greater than the downstream channel width, an anode positioned at the channels entry, and a gas distributor configured to release a propellant gas into the thruster channel. The magnetic circuit is configured to generate a magnetic field in the thruster channel for trapping electrons therein. The channel walls (the magnetic poles) are under bias potential. The anode and the cathode are configured to generate a substantially axial electric field in the thruster channel. In operation, propellant gas atoms ionized by trapped electrons in the thruster channel, accelerate axially, exiting via the channels exit.

The present disclosure attempts to provide novel systems and methods that overcome at least some of the disadvantages of prior art systems and methods. In particular, the present disclosure provides methods of ensuring the efficient ignition and operation of the Hall thruster described in the above mentioned WO 2019/116371

The disclosures of each of the publications mentioned in this section and in other sections of the specification, are hereby incorporated by reference, each in its entirety.

SUMMARY

The present disclosure describes new exemplary systems and methods for narrow channel Hall Thruster, which enables easier ignition at a lower voltage than previously available Hall thrusters. The Hall thrusters on which this new method can be applied are those with a narrow discharge channel, such as that shown in the above mentioned WO 2019/116371.

In such Hall thrusters, the cathode, which can be a filament driven cathode, or an arc hollow cathode, is used in order to generate a stream of electrons which will neutralize the charged ion stream emitting from the annular thrust aperture. The objective is to ensure the generation of a neutral stream of propellant gas emitted from the thrust aperture. The cathode should be located in a position that does not interfere with the free passage of the emitted propellant gases from the exit aperture, and can thus be located either outside of the annular aperture or inwards of the exit aperture, at the center of the thruster. The thruster could not begin to operate without this neutralizing beam of electrons.

In prior art, large aperture discharge channels, electrons from the cathode will be emitted directly into the clearly accessible electric field between the anode and cathode, and there is no difficulty in neutralizing positively charged ions in the beam. Furthermore, the discharge voltage used in such large aperture channels is generally substantially higher (300V) than those of the small aperture implementations of the present application (100V), such that the electric field used is accordingly higher. However, in the narrow channel Hall thruster geometry, because of the very small output aperture of the ionized beam, electrons emitted by the cathode, which is offset from the beam output direction in order not to interfere with the flow of propellant out of the aperture, do not experience the electric field of the anode, as it is recessed deep in the thruster channel with only a narrow gap to the outside. The thruster of the present disclosure provides a method of enabling easy ignition and efficient operation of the discharge, despite the problematic geometry, from the point of view of the ignition process, of the discharge channel.

The presently described thruster includes an additional power supply called the cathode coupling power supply, or cathode coupling voltage source, which applies a negative voltage to the cathode relative to the body of the thruster, thereby providing the emitted electrons with a higher effective energy, and facilitating their passage across the electric field and into the thruster channel. Without this additional cathode bias power supply, it would be difficult to turn on the plasma discharge, because of the small field exposure of the cathode electrons to the anode. If the cathode were at the same potential as the body, the voltage required to initiate the discharge would have to be substantially increased, which would negate the advantages imbued by used of the narrow channel geometry, would be energy expensive and would complicate the need for insulation of the anode.

The front body of the thruster, that facing the cathode, is covered with a thin insulator layer, with a gap at the aperture to enable the propellant gas to be emitted. An additional accelerator electric field is generated between the cathode and the metal of the thruster body behind the insulator layer.

The cathode biasing power supply is intended to operate only during the initial ignition of the plasma discharge. Once the discharge has started, it is self-sustaining from the applied anode to thruster body potential, and there is no further need for the bias voltage to be applied to the cathode. The cathode bias power supply should therefore be such that after ignition of the discharge, its output voltage falls to zero. This avoids unnecessary expenditure of energy. This characteristic of the power supply can be achieved by configuring its regulation characteristics to cause the output voltage to drop to zero once the full predefined current level is generated.

Instead of a conventional power supply for biasing the cathode during startup, it is possible to use any other voltage source which will reduce its level once the plasma discharge has commenced in the channel. One such possibility is the use of a high-capacity capacitor, which can be charged up to the required voltage before initiating discharge, and discharge of the stored energy in the capacitor when the plasma discharge is intended to come into operation. The charge stored in the capacitor can be adjusted such that the charge is fully discharged once the plasma discharge has begun. A battery can also be used, with a suitable control system, or designed to have a capacity and a high current discharge ability such that the charge can be delivered in the time taken for the thruster discharge to ignite and reach a stable discharge configuration. It is noted that the polarity of the capacitor or battery charge must be such that they deliver their charge into the thruster power circuit in a direction such that current is drawn from the cathode.

This additional cathode biasing supply is used with a novel start up procedure for the thruster discharge, involving adjustment of the mass flow, the magnetic field and the self-regulated power supply output in order to accomplish the start-up. At the outset, the magnetic field has to be set at a low level, to enable a sufficient flow of electrons to facilitate start-up. The cathode biasing supply is activated, and the full anode voltage applied until the plasma discharge strikes. Once the discharge has commenced, the level of current through the anode supply and the cathode coupling supply causes the voltage of the cathode coupling supply to fall towards zero, and the discharge continues on just the anode voltage. This arrangement reduces any wasted power keeping the cathode coupling supply operating, when it is not needed because the discharge is operating independently of its additional voltage support.

There is thus provided in accordance with an exemplary implementation of the devices described in this disclosure, a narrow channel Hall thruster, comprising:
(i) a thruster body comprising a magnetic circuit,
(ii) an annular thruster channel formed within the magnetic circuit, and having a channel width of 3 mm or less,
(iii) an annular anode positioned at or near the annular thruster channel,
(iv) a cathode positioned externally to the annular thruster channel, and configured for electron emission,
(v) a first power supply configured to apply a positive potential to the anode relative to the thruster body and the cathode, such that a plasma discharge can be generated in gases within the annular thruster channel, and
(vi) a second power supply configured to apply a negative potential to the cathode, relative to the thruster body and the anode,
wherein the second power supply is configured to reduce its negative potential output applied to the cathode, when the current supplied by the first power supply exceeds a predetermined level.

In such a thruster, the predetermined level of current supplied by the first power supply may be representative of the current of the plasma discharge when it has reached a predetermined level of its normal operating power. In either of the above described thrusters, the reduction of negative potential of the second power supply output, may be generated by the self-regulation of the second power supply. Alternatively, it could be generated either by the output signal of a current limiter circuit, or by a feedback signal provided by a current sensor in the circuit comprising the first power supply.

In any of the above described thrusters, the cathode may be activated by a third power supply to emit a stream of electrons. The cathode may be any one of a thermionic cathode, a hollow cathode, a field emission cathode, a radiofrequency cathode or a microwave cathode.

According to yet another implementation of the thrusters of this disclosure, the second power supply may be either a charged capacitor or a battery, either of them configured to draw current from the cathode at a level which will suffice until the current supplied by the first power supply is expected to exceed a predetermined level.

Furthermore, in any of the above described thrusters, the second power supply may be configured to reduce its negative potential output applied to the cathode towards zero when the current supplied by the first power supply exceeds a predetermined level.

There is further provided, according to other implementations described in this application, a method of initiating the discharge of a narrow channel Hall thruster, the thruster comprising,
(i) a thruster body comprising a magnetic circuit,
(ii) an annular thruster channel formed within the magnetic circuit, and having a channel width of 3 mm or less,
(iii) an annular anode positioned at or near the annular thruster channel, and
(iv) a cathode positioned externally to the annular thruster channel, and configured for electron emission, the method comprising the steps of:
    (a) applying a positive potential to the anode relative to the thruster body and the cathode, such that a plasma discharge can be generated in gases within the annular thruster channel, and
    (b) applying a negative potential to the cathode relative to the thruster body and the anode,
wherein the negative potential applied to the cathode is reduced when the current supplied to the anode exceeds a predetermined level.

In such a method, the predetermined level of current supplied to the anode may be representative of the current of the plasma discharge when it has reached a predetermined level of its normal operating power. In either of the above described methods, the reduction of negative potential applied to the cathode may be generated by the self-regulation of the power supply generating that negative potential. Alternatively, it could be generated by the output signal of a current limiter circuit, or by a feedback signal provided by a current sensor in the circuit supplying the anode with current.

In any of the above described methods, the cathode may be activated by a power supply to emit a stream of electrons. The cathode may be any one of a thermionic cathode, a hollow cathode, a field emission cathode, a radiofrequency cathode or a microwave cathode.

According to yet another implementation of the methods of this disclosure, the negative potential applied to the cathode may be obtained either from a charged capacitor or a battery, configured to draw current from the cathode at a level which will suffice until the current supplied by the first power supply is expected to exceed a predetermined level.

Furthermore, in any of the above described methods, the negative potential applied to the cathode may be reduced towards zero when the current supplied to the anode exceeds a predetermined level.

BRIEF DESCRIPTION OF THE DRAWINGS

The present invention will be understood and appreciated more fully from the following detailed description, taken in conjunction with the drawings in which.

DETAILED DESCRIPTION

Figure 1:
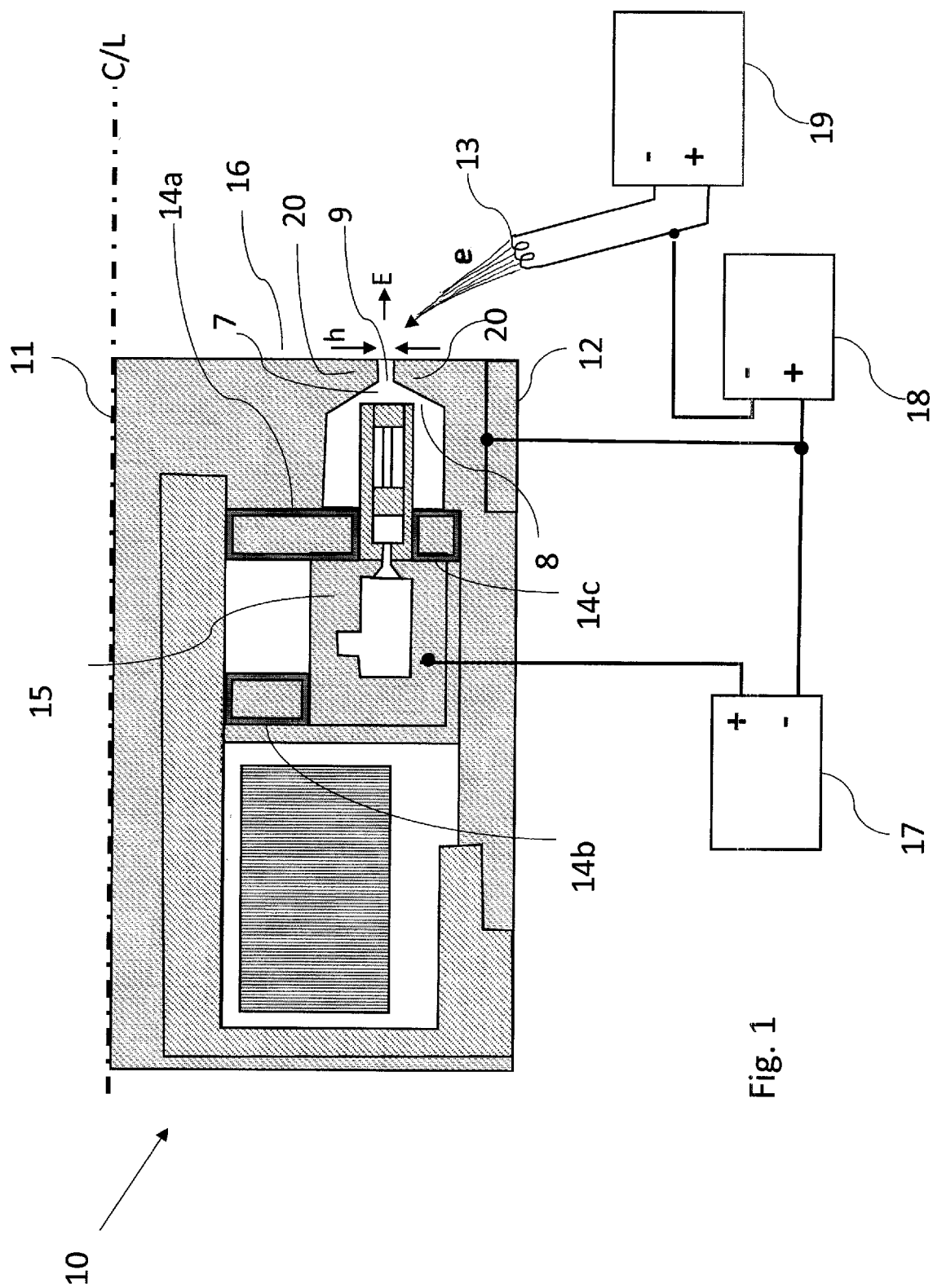
FIG. 1 illustrates schematically a cross-sectional view of an exemplary closed electron-drift, narrow channel Hall thruster (NCHT), including an additional cathode biasing power supply, according to the present disclosure.

Reference is now made to FIG. 1, which illustrates schematically a schematic cross-sectional view of an exemplary closed electron-drift, narrow channel Hall thruster (NCHT) according to the present disclosure. For simplicity, only half of the NCHT is depicted, with the other half being understood to exist above the center line C/L. The NCHT thus has an annular form, with the exit gap of the propellant being in the form of a narrow annulus.

The NCHT is constructed using the geometry shown in the previously mentioned WO 2019/116371, hereby incorporated by reference in its entirety, and to which reference is to be made for features not specifically described in this disclosure. The NCHT includes a thruster body 10 and an external, neutralizing cathode 13 configured for electron emission and positioned outside of the thruster body 10. Thruster body 10 incorporates a discharge chamber and an annular, or substantially annular, thruster channel 7 which forms a part of the discharge chamber, and fluidly couples the discharge chamber to the outside of thruster body 10 through a narrow gap of width h. For a 30 to 50 W motor, the gap can be of the order of 2 mm. The discharge chamber is shown having a partly tapered cross-sectional form, tapering from a first extremity 8 to a second extremity 9, towards the exit aperture, this providing the optimum properties of the narrow channel geometry, but it could also have a more cylindrical form, with the advantages of the NCHT being attained by the small cross section which generates the narrow channel for the discharge, and hence, a small exit gap for the emission of the propellant gas.

Thruster body 10 further includes a magnetic circuit 20, an anode 15, which is electrically associated with cathode 13, and a gas distributor. Thruster body 10 has an insulating layer 16 such as a thin ceramic coating, which covers its body 10 and functions to prevent short circuit or power loss between cathode 13 and thruster body 10. Cathode 13 may be a thermionic cathode (e.g. a tungsten filament), a hollow cathode, a field emission cathode, or a radiofrequency/microwave cathode.

The voltage for the functioning of the discharge of the thruster is supplied by a power supply 17, supplying the positive potential to the anode 15, relative to the body 12 of the thruster. The anode is insulated from the thruster body at ground potential by insulator blocks 14a, 14b, 14c. The cathode shown in FIG. 1 is a thermionic filament-based cathode 13, the filament current being generated in the power supply 19. If a hollow cathode is used for supplying the electrons, it too will have its own power supply.

The channel length of the thruster channel is designed to be comparable in dimensions to the exit gap width h. The relative shortness of thruster channel means that a substantial electric field within thruster channel may be generated even at low discharge voltages of less than 100 V, i.e. even when the potential difference between anode 15 and cathode 13 is smaller than 100 V.

However, even using this construction, because the cathode 13 is offset from the beam output direction in order not to interfere with the flow of propellant out of the aperture gap, and because of the very small size, h, of this output gap, electrons, shown by the shower trajectory e, emitted by the cathode 13, are not able to readily be influenced by the field E produced by the anode potential, as the anode is recessed deep in the thruster channel, and the field E external to the discharge aperture is small.

In order to overcome this limitation, and to provide a sufficient electron flow to neutralize the ion content of the propellant beam, the electrical operation of the thruster discharge differs from prior art configurations, in that an additional power supply 18 is provided, which is used to apply an additional negative potential to the cathode, over and above the anode-body potential, thereby increasing the electric field E between the anode and the cathode. In prior art configurations, the electric field experienced by the electrons emitted by a cathode held at the same potential as the thruster body, is more limited, such that a larger anode voltage would be needed to generate sufficient neutralizing electron flow. The provision of a higher anode voltage would thus diminish the advantage gained by the use of the narrow channel thruster configuration and its lower operating anode voltage. Use of the additional voltage generated by the cathode coupling power supply 18, increases the sensed electric field E, thereby ensuring a sufficient electron flow without the need to increase the anode voltage, thereby maintaining the advantages of the narrow channel geometry. The voltage supplied by the cathode coupling power supply may be almost double that of the anode supply voltage. In a typical application for a 30 to 50 W thruster, in which the applied anode voltage may be 100V, the cathode coupling voltage could be 80 V.

However, since the additional electric field is only required during ignition start-up, the cathode coupling voltage supply has to possess specific regulation characteristics in order to ensure efficient energy operation. Once the discharge is struck and stabilized, the cathode coupling supply output should be reduced to zero, since the discharge is now maintained by the anode voltage applied. The regulation of the cathode coupling power supply should therefore be configured to reduce the output voltage to zero as soon as the power supply is providing the rated current expected by the thruster discharge.

Figure 2:
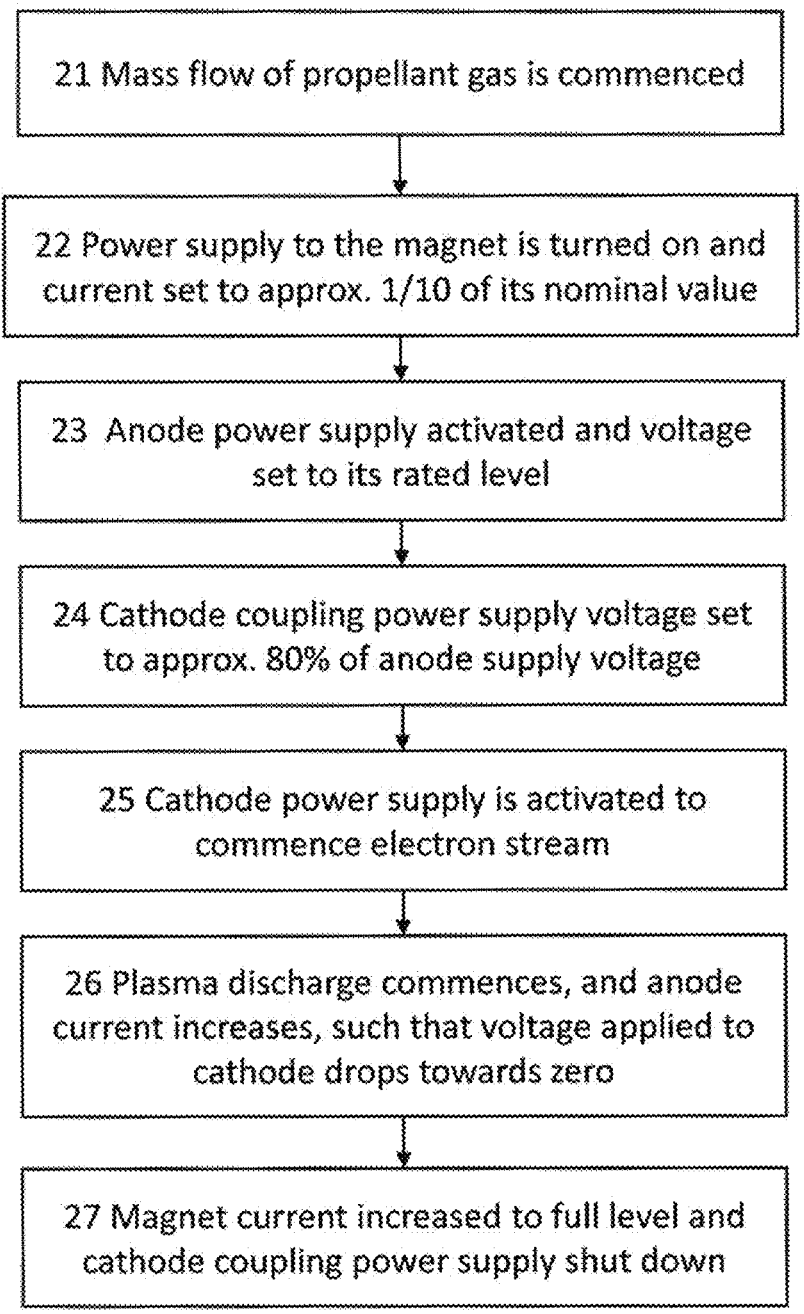
FIG. 2 is an exemplary flow chart describing the start-up procedure used for the thruster configuration shown in FIG. 1.

Reference is now made to FIG. 2, which is a flow chart showing an exemplary start-up operational sequence of the thruster of the present disclosure. Where specific numbers are given for quantities, those numbers relate to a narrow channel thruster having a power output of the order of between 30 and 50 W. In step 21, the mass flow of propellant gas is commenced, such that the thrust motor is ready for the ignition procedure. If a hollow cathode is used to generate electrons from a plasma discharge, instead of a filament based cathode, the gas for the hollow cathode discharge must also be commenced.

In step 22, the power supply to the magnetic coil is turned on and the current is set to approximately 1/10 of its nominal value, which is the value when the thruster is operating at its full rated power. The magnetic field is reduced during startup, in order to prevent the magnetic field from acting as a block to the incoming electron stream from the cathode, which would occur if the full strength magnetic field were to be present. Because of the critical nature of the startup procedure of the discharge, it is essential to prevent any impediment to successful ignition.

In step 23, the anode power supply is activated, and the output voltage set to its rated level of 100V, the power supply being able to provide a current of 0.5 A.

In step 24, the cathode coupling power supply voltage is set to approximately 80 V, and the supply is turned on.

Without a supply of electrons, the thrust motor will have difficulty in starting under the above generated conditions, such that in step 25, the cathode power supply 19 is activated to supply the required stream of electrons for enabling the thruster motor discharge to start. In the case of a filament based cathode, the filament current will be activated, and in the case of a hollow cathode arrangement, the electronic ignition block and its power supply is turned on.

In step 26, under the above generated conditions, the plasma discharge will be ignited and the motor will commence to generate thrust. Once the plasma discharge is struck, it will draw its full stable current from the anode power supply 17, while the cathode coupling power supply voltage will fall to nearly zero, in accordance with the regulation characteristic of the cathode coupling supply. This regulation can be achieved either by use of a current limiting circuit, which drops the voltage to zero when the current limit is reached, or by ensuring that the internal resistance of the supply is such that when the its full rated current will drop the output voltage to close to zero. For the example power supply circuits described above, the current limit could be set at 0.3 A, compared with the full power current of 0.5 A drawn by the thruster discharge. In any event, the cathode coupling power supply should maintain electrical connection with the cathode, such that that part of the discharge current flowing from anode to cathode can continue through its closed circuit. Under these conditions, with the thruster operating at its rated power in a steady-state, a plasma bridge appears in the plasma current path, with a potential drop of the order of 10 to 20 V, which couples the cathode electrons to the anode, such that the coupling power now comes from the anode power supply. The remaining 80 to 90 V of the anode power supply output goes towards maintaining the discharge in the thruster motor.

In step 27, since the discharge is now fully operating, the magnet coil current can now be increased to its full nominal level with the thrust fully operating, and the coupling power supply can be completely shut down, while still providing a conductive path for the discharge current. This procedure of shutting down the cathode coupling supply saves any unnecessary power dissipation.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

I claim:

1. A narrow channel Hall thruster, comprising:
a thruster body comprising a magnetic circuit;
an annular discharge channel formed within the magnetic circuit, the annular discharge channel having a first extremity having a first channel width, and a second extremity, downstream from the first extremity and having a second channel width, the second channel width being 3 mm or less, and the first channel width being greater than the second channel width;
an annular anode positioned in the annular discharge channel;
a cathode positioned externally to the annular discharge channel, and configured for electron emission;
a first power supply configured to apply a positive potential to the annular anode relative to the thruster body and the cathode, such that a plasma discharge can be generated in gases within the annular discharge channel; and
a second power supply configured to apply a negative potential to the cathode, relative to the thruster body and the annular anode,
wherein the second power supply is configured to reduce the negative potential applied to the cathode, when a current supplied by the first power supply exceeds a predetermined level.

2. The narrow channel Hall thruster according to claim 1, wherein the predetermined level of current supplied by the first power supply is representative of a current of the plasma discharge when the plasma discharge has reached a predetermined level of a normal operating power.

3. The narrow channel Hall thruster according claim 1, wherein the second power supply reduces the negative potential applied to the cathode due to self-regulation of the second power supply.

4. The narrow channel Hall thruster according to claim 1, wherein the second power supply reduces the negative potential applied to the cathode in response to an output signal of a current limiter circuit.

5. The narrow channel Hall thruster according to claim 1, wherein the second power supply reduces the negative potential applied to the cathode in response to a feedback signal provided by a current sensor in a circuit comprising the first power supply.

6. The narrow channel Hall thruster according to claim 1, wherein the cathode is activated by a third power supply to emit a stream of electrons.

7. The narrow channel Hall thruster according to claim 1, wherein the cathode is any one of a thermionic cathode, a hollow cathode, a field emission cathode, a radiofrequency cathode or a microwave cathode.

8. The narrow channel Hall thruster according to claim 1, wherein the second power supply is either a charged capacitor or a battery, wherein the second power supply is configured to draw current from the cathode until a current supplied by the first power supply is expected to exceed a second predetermined level.

9. The narrow channel Hall thruster according to claim 1, wherein the second power supply is configured to reduce the negative potential output applied to the cathode towards zero when a current supplied by the first power supply exceeds a second predetermined level.

10. A method of initiating a discharge of a narrow channel Hall thruster, the narrow channel Hall thruster comprising;
a thruster body comprising a magnetic circuit;
an annular discharge channel formed within the magnetic circuit, the annular discharge channel having a first extremity having a first channel width, and a second extremity, downstream from the first extremity and having a second channel width, the second channel width being 3 mm or less, and the first channel width being greater than the second channel width;
an annular anode positioned in the annular discharge channel; and
a cathode positioned externally to the annular discharge channel, and configured for electron emission;
the method comprising:

applying a positive potential to the annular anode relative to the thruster body and the cathode, such that a plasma discharge can be generated in gases within the annular discharge channel; and applying a negative potential to the cathode relative to the thruster body and the annular anode, wherein the negative potential applied to the cathode is reduced when a current supplied to the annular anode exceeds a first predetermined level.

11. The method according to claim 10, wherein the first predetermined level is representative of a current of the plasma discharge when the plasma discharge has reached a predetermined level of normal operating power.

12. The method according to claim 10, wherein the negative potential applied to the cathode is reduced due to self-regulation of a power supply generating the negative potential applied to the cathode.

13. The method according to claim 10, wherein the negative potential applied to the cathode is reduced due to an output signal of a current limiter circuit.

14. The method according to claim 10, wherein the negative potential applied to the cathode is reduced due to a feedback signal provided by a current sensor in a circuit supplying the annular anode with current.

15. The method according to claim 10, wherein the cathode is activated by a power supply to emit a stream of electrons.

16. The method according to claim 10, wherein the cathode is any one of a thermionic cathode, a hollow cathode, a field emission cathode, a radiofrequency cathode or a microwave cathode.

17. The method according to claim 10, wherein the negative potential applied to the cathode is obtained either from a charged capacitor or a battery, configured to draw current from the cathode until a current supplied by a first power supply is expected to exceed a second predetermined level.

18. The method according to claim 10, wherein the negative potential applied to the cathode is reduced towards zero when the current supplied to the annular anode exceeds a second predetermined level.

* * * * *